Figure 1:
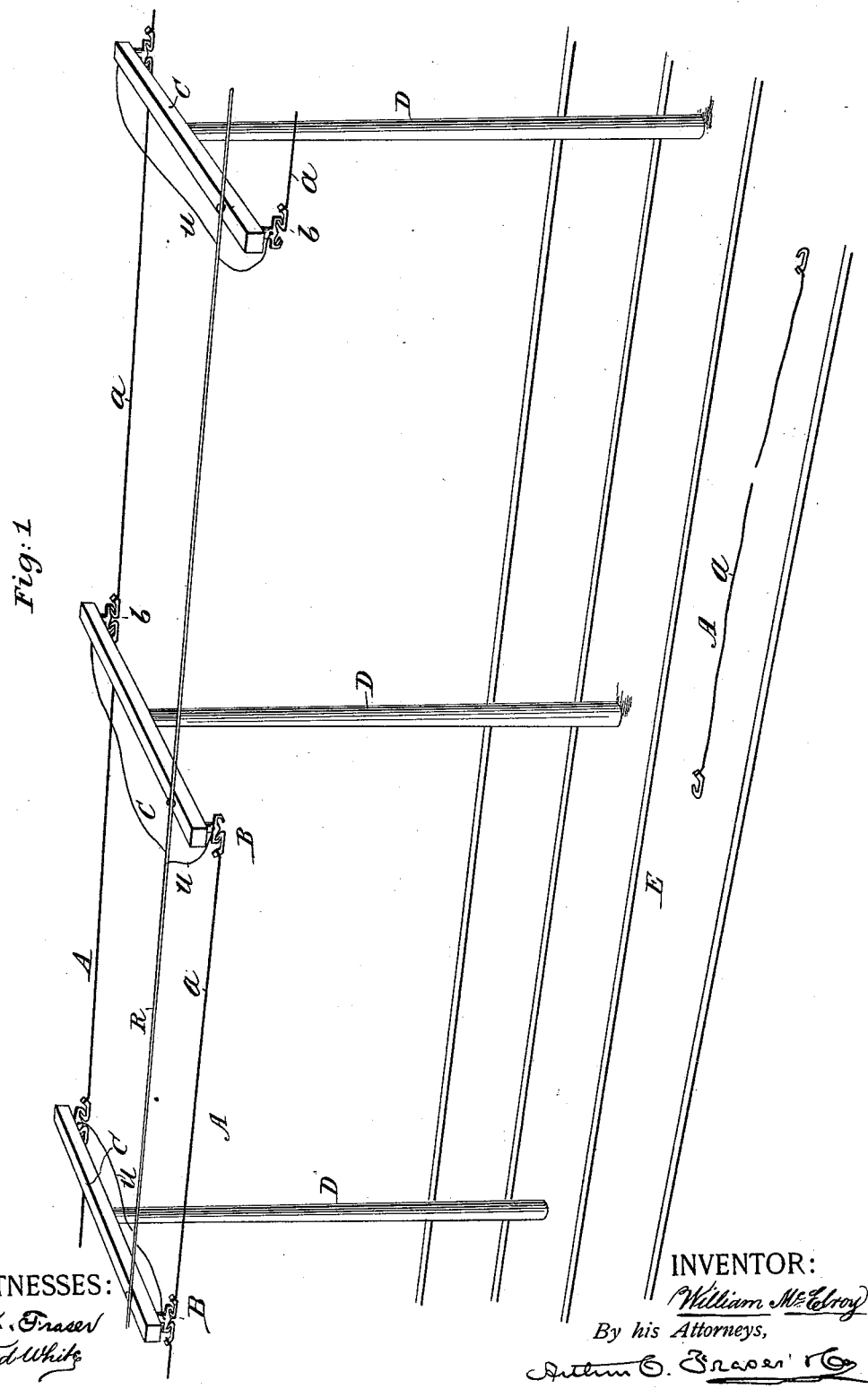

(No Model.) 3 Sheets—Sheet 1.

W. McELROY.
ELECTRIC CONDUCTOR AND CONNECTION AND SUPPORT THEREFOR.

No. 592,815. Patented Nov. 2, 1897.

WITNESSES:
C. K. Fraser
Fred White

INVENTOR:
William McElroy
By his Attorneys,
Arthur C. Fraser

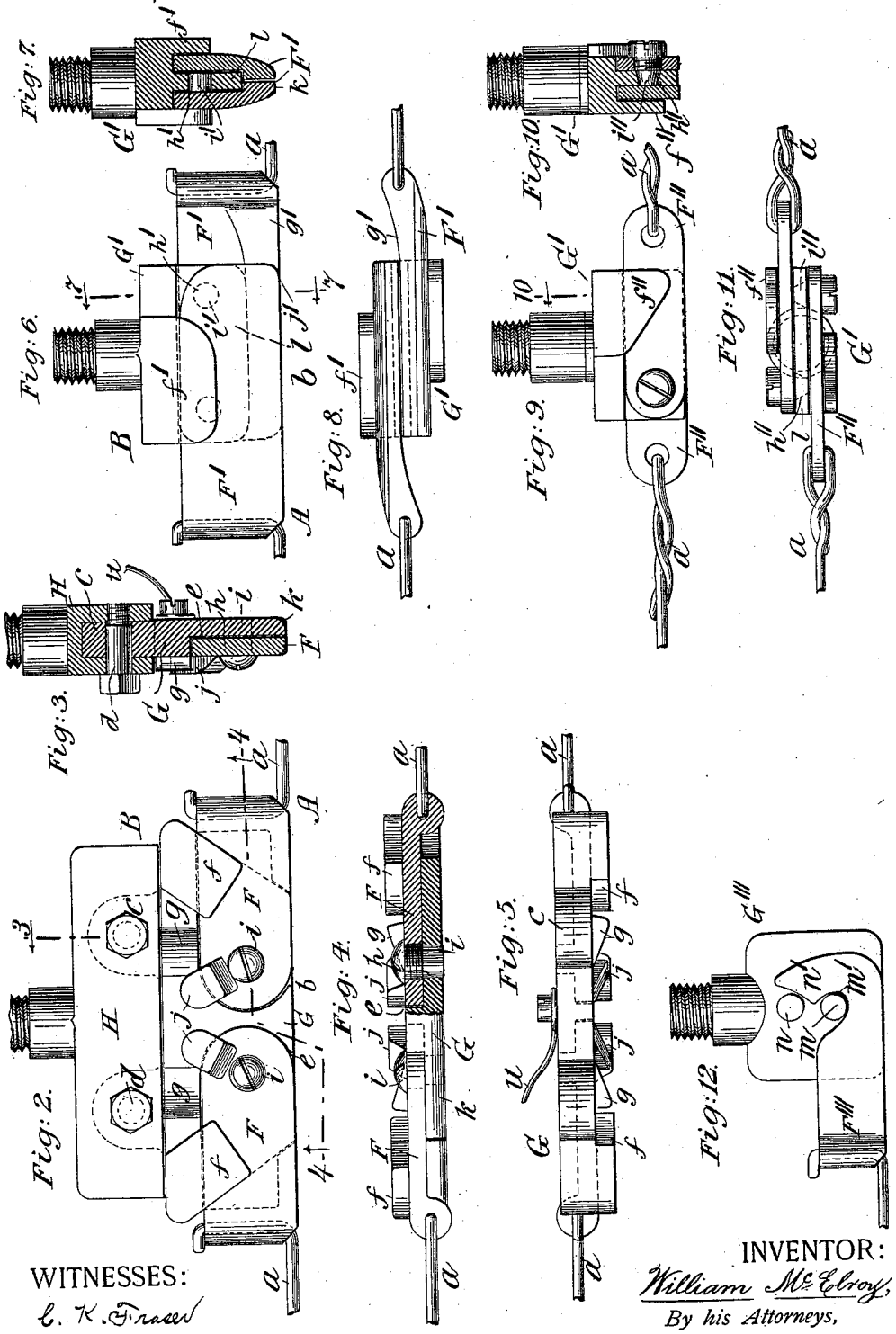

(No Model.) 3 Sheets—Sheet 3.
W. McELROY.
ELECTRIC CONDUCTOR AND CONNECTION AND SUPPORT THEREFOR.
No. 592,815. Patented Nov. 2, 1897.
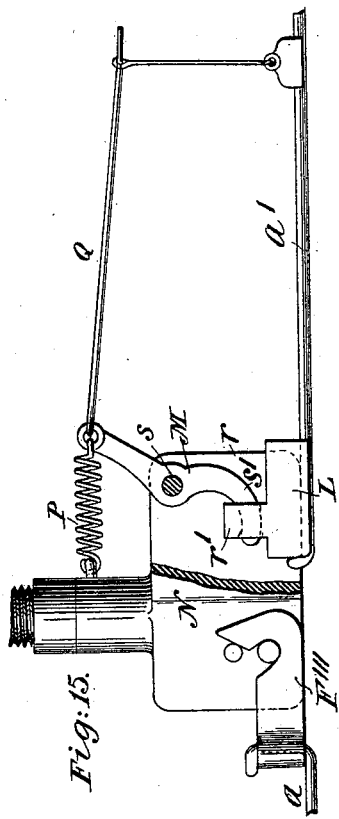
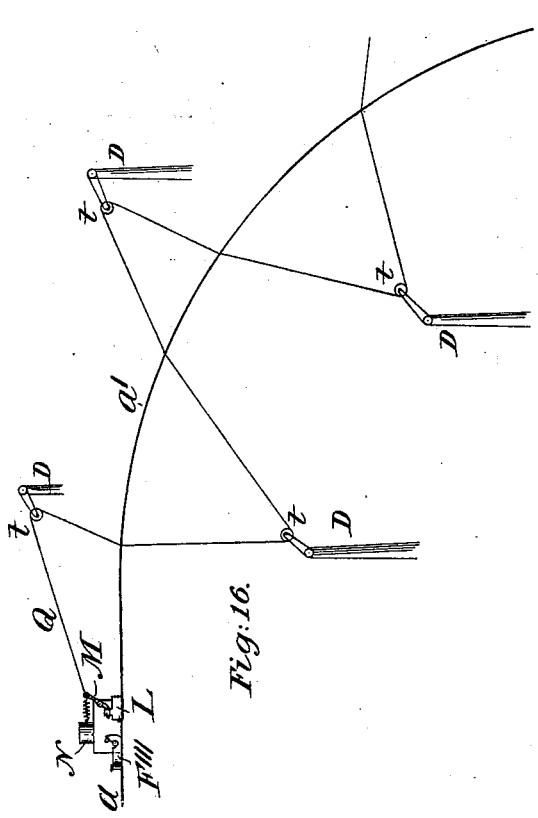
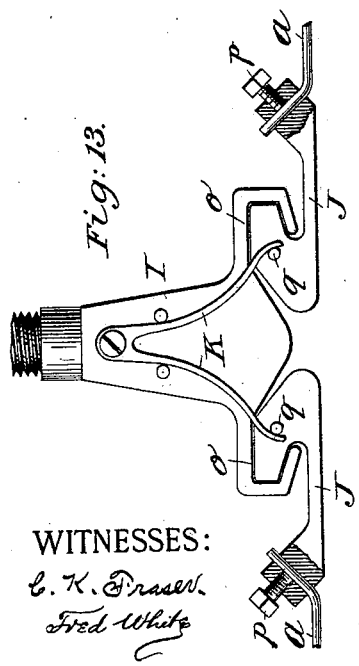
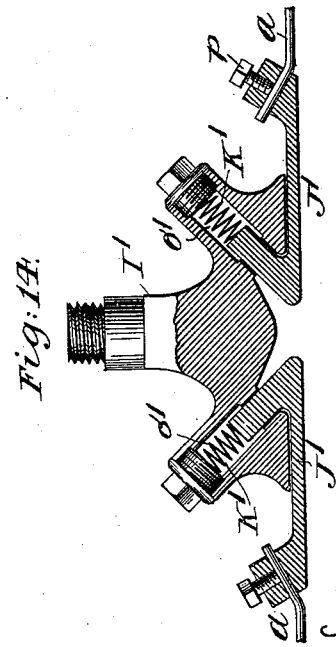
WITNESSES:
INVENTOR:
William McElroy,
By his Attorneys,

UNITED STATES PATENT OFFICE.

WILLIAM McELROY, OF BROOKLYN, NEW YORK, ASSIGNOR, BY MESNE ASSIGNMENTS, TO GEORGE H. FRASER, OF SAME PLACE.

ELECTRIC CONDUCTOR AND CONNECTION AND SUPPORT THEREFOR.

SPECIFICATION forming part of Letters Patent No. 592,815, dated November 2, 1897.

Application filed April 30, 1892. Serial No. 431,294. (No model.)

*To all whom it may concern:*

Be it known that I, WILLIAM MCELROY, a citizen of the United States, residing in Brooklyn, in the county of Kings and State of New York, have invented certain new and useful Improvements in Electric Conductors and Connections and Supports Therefor, of which the following is a specification.

This invention relates to electric conductors, to connections between the conducting-sections, and to supports for the conductors and for their connections. It is generally applicable to electric conductors, but is especially adapted for application to suspended electric conductors—such as trolley-wires, for example.

Heretofore such conductors, in case of their material displacement due to sagging by reason of alteration in their tension, or due to other cause, or in case of their breakage, have been dangerous to life and property, because still constituting part of a charged electric circuit liable to be short-circuited through anything with which their displaced or broken portions may come in contact.

Heretofore various connections have been used aiming to overcome this disadvantage and to avoid the danger incident to breakage or displacement of such wires or a material reduction in the tension under which they are suspended; also, to provide certain improvements in the connections between the respective sections of electric conductors and in the supports therefor. To this end such devices have consisted of a connection for the conducting-section adapted normally to maintain it in electrical connection with an electric circuit, but to cut out said section upon its displacement, breakage, or material reduction in its tension. My invention aims to provide an improved device of this character.

In the accompanying drawings, which illustrate certain forms of my invention as applied to trolley-wires, Figure 1 is a perspective view of a section of trolley-wires strung according to my invention, one of the sections of one conductor being shown as broken and detached from the circuit. Fig. 2 is a side elevation of the preferred form of connection between the sections of conductor and of support therefor. Fig. 3 is a cross-section thereof on the line 3 3 in Fig. 2. Fig. 4 is an under side plan thereof, partially in horizontal section, on the line 4 4. Fig. 5 is a top view with the supporting-block removed. Fig. 6 is a view similar to Fig. 1, showing a modified construction of connection and support. Fig. 7 is a cross-section thereof on the line 7 7. Fig. 8 is an under side plan thereof. Fig. 9 is an elevation of another form of connection and support. Fig. 10 is a cross-section thereof on the line 10 10. Fig. 11 is an under side plan thereof. Fig. 12 is a side elevation of another modified form of connection and support. Fig. 13 is an elevation of another form. Fig. 14 is a vertical section of another form of connection and support. Fig. 15 is an elevation of another form, the right-hand side being especially adapted for a curved conductor; and Fig. 16 is a diagrammatic view of a curved trolley-wire supported by the connection and support shown in Fig. 15.

Referring to the drawings, let A A indicate the conductors as a whole, which in this instance are trolley-wires; B B, the supports and connections therefor; C, the cross-bars carrying the supports B; D, the poles carrying the cross-bars, and E the rails of a trolley-road.

According to my invention the conductors A are constructed of a plurality of conducting-sections *a* and intervening sections *b*. The sections *a* are simple lengths of wire or other electric conductor, and the intervening sections *b* are of any construction serving normally to maintain the sections *a* in electrical communication with an electric circuit, but to cut them out of communication therewith in case of their displacement, alteration of tension, or breakage, whereby in such event the section so impaired will become a dead-wire and therefore harmless of manipulation. This may be accomplished in many ways well known to those skilled in the art. I prefer to accomplish it by using a combined support and connection in which the terminal members on the respective sections *a* are engaged and supported by a supporting-piece, the sections, their terminal members, and the supporting-pieces each constituting part of the electric circuit whereby electrical communication exists from one section through its terminal member and supporting-piece to the terminal member of the other section and thence to the latter. One construction of this principle is shown in Figs. 2, 3, 4, and 5. In this construction F F indicate the terminal members of the adjacent sections *a a*, and G indicates the supporting-piece. The latter is here shown as an elongated metallic block having perforated lugs *c c* at top, entering sockets in a bracket H and held therein by bolts *d*. The bracket H is adapted to be supported by any suitable support, such as a cross-bar C, Fig. 1. The piece G is preferably constructed with recesses *e* in its sides, flanges *f*, overhanging said recesses, cam projections *g*, above said recesses, and lateral holes *h* through its wall near the inner ends of said recesses. The terminal pieces F preferably constitute hooks for engaging the conducting-sections *a* with the supporting-pieces G. They are preferably constructed with body portions adapted to enter the recesses *e* in the pieces G, and when in position therein to lie within the flanges *f* of the latter. Preferably they are provided with vertical perforations at their outer ends, through which the ends of the wire of the conductor may pass and be fastened either by bending over, as shown, or in any manner. Near their inner ends they are provided with provisions for preventing their separation from the supporting-piece G. Preferably this is accomplished by providing a stud or pin *i* on the terminal pieces F, adapted to engage with the hole *h* in the piece G and normally prevent the separation of the parts. This is shown as accomplished by tapping a screw through each terminal piece F and utilizing its projecting end as the stud *i*. Preferably the pieces F are constructed each with a projecting arm *j*, extending beyond the recess *e* and adapted to engage with cam projection *g*, adjacent to its piece F. In this construction when the section *a* is in place and under the requisite tension its terminal piece F lies within the recess *e* of the supporting-piece G with its flat body under the flange *f*, its stud *i* within the corresponding recess *h* of the piece G, and its arm *j* adjacent to but out of engagement with the cam projection *g* of the supporting-piece. In this position the separation of the terminal piece F from the supporting-piece G in longitudinal direction is prevented by the abutment of its stud against the wall of the hole *h*, and its lateral separation therefrom is prevented by the overhanging flange *f* of the supporting-piece. In this position electrical communication between the terminal piece F and the supporting-piece G is afforded through their intimate contact, and this communication extends by reason of the like contact of the terminal piece of the adjacent section to the latter, these terminals constituting the terminal pieces and the supporting-piece and intervening electrical bridge between the two sections.

In order to cut out either section in case of impairment, the terminal piece of each and the corresponding supporting-piece are constructed according to this form to disengage from each other. This is preferably accomplished by constructing the terminal piece to oscillate relatively to the supporting-piece on its stud *i* in case its section *a* of the conductor is impaired, either by displacement, alteration of tension, or breakage, to a sufficient extent to free itself from the supporting-piece G, whereupon it will drop therefrom and be cut out of the electric circuit. In case of such oscillation the end of the terminal piece F as it oscillates downwardly will pass from under the flange *f* of the supporting-piece G, and meanwhile its arm *j* will ride up the cam projection *g* of the supporting-piece and by reason thereof will force the terminal piece out of the recess *e* until its stud *i* is free from the hole *h* of the supporting-piece, whereupon the terminal piece and its end of the section *a* will be disengaged from the supporting-piece and drop therefrom, thus completely cutting it out from the electric circuit.

In operation when using the connection and support illustrated in Figs. 2 and 5 the bracket H is suspended in any suitable manner with the supporting-piece G. The terminal pieces F are passed over the ends of their wire sections *a* and then are raised with their inner ends uppermost and passed into their recesses *e* at such inclination that they pass the lower end of the overhanging flange *f*. As they are thus entered into their recesses their respective studs *i* engage the holes *h* of the piece G, whereupon the terminal piece may be turned up in the recess behind the flange *f* into the position shown in Fig. 2. Its escape will then be prevented, as explained, until impairment of its section *a*. The desired tension of the section *a* may be secured by straining it to the proper extent and then adjusting the slack of its end relatively to its terminal piece and fastening its end in the adjusted position in any suitable manner.

Preferably the lower edges of the terminal pieces F F and of the supporting-piece G are arranged to be substantially on a line with the direction of the adjacent sections A A and flush with the under sides thereof, and they are rounded or beveled on their outer edges, as shown at *k k*, when used with trolley-wires to present a more advantageous surface for the action of the trolley.

In trolley systems it is common to use a separate supply-wire in connection with the trolley-wires. Such a wire is shown in Fig. 1 at R, and branch wires *u u* are shown as leading therefrom to the respective supporting-pieces of each section. This is the most advantageous way to use my invention in connection with a trolley system, as thereby the dropping out of any impaired section does not affect the continuity of the electric circuit along the line, since the circuit is in this arrangement supplied by the separate supply-wire of each section. In Figs. 3 and 4 the connection of this branch supply-wire $u$ with the supporting-piece G is shown.

The construction of supporting-piece and terminal pieces shown in Fig. 1 consists of simple hooks engaging sockets in supporting-pieces.

It will be seen that my invention provides a simple improvement in electric conductors by means of which danger incident to impairment of the conductor is avoided. It constitutes a safety provision for such conductors, which can be readily availed of and will be effective in operation.

My invention may be availed of in whole or in part in various forms without departing from its essential features, as will be apparent to those skilled in the art, and it will be understood that I do not limit myself to the particular constructions and details herein set forth, as these are only a few of numerous mechanical and electrical provisions which may be utilized to avail of the essential features of my invention.

Figs. 6, 7, and 8 show a modification of the supporting and terminal pieces. The supporting-piece (lettered G') is shown as constructed with a central wing $l$, having holes $h'$ near its opposite ends and having flanges $f'$ at its opposite sides, and the terminal pieces (here lettered F') are shown as engaging the opposite sides of the wing $l$ between the wing and the flanges $f'$, respectively, and each having integral studs $i'$, entering one of the holes $h'$ in the wing. Each terminal piece projects inwardly at its inner side to about half the thickness of the wing $l$, practically inclosing the latter, and each is constructed with an incline or cam-face $g'$ at its inner side beyond and adjacent to the end of the other terminal piece. In this construction in operation the terminal piece will be separated from the supporting-piece G' by the action of its inner end $j'$ against the cam-face $g'$ as the supporting-piece is oscillated downwardly, the cam-face moving it laterally until its stud $i'$ is disengaged from the hole $h'$, at which time its body has passed from behind the wing $f'$. In this construction the lower edges of the terminal pieces are beveled, as before, to present a rounded surface to the trolley.

The construction shown in Figs. 9, 10, and 11 is identical to that shown in Figs. 6, 7, and 8 in many respects, the principal difference being that the holes through the wing $l$ are tapered, and the terminal pieces (here lettered F'') are plain links having eyes at their outer ends, through which the conducting-wire is twisted, and having tapered studs (here lettered $i''$) engaging the tapered holes (lettered $h''$) in the wing $l$. In operation the tendency of the links is to move laterally by reason of the beveled holes and studs, but so long as the position or tension of the sections $a$ serves to retain the terminal pieces in engagement with their respective flanges (here lettered $f''$) these flanges will prevent the escapement of the terminal pieces from the supporting-piece. As soon as the other terminal piece is inclined sufficiently to be free from its flange its beveled stud will immediately escape from its hole, and the terminal piece will thereupon become disengaged from the supporting-piece and cut out from the circuit of which it formed part.

Fig. 12 shows a simple modification wherein the supporting-piece (here lettered G''') is constructed with two lateral projecting pins $m$ and $n$, and the terminal piece (here lettered F''') is formed with a recess $m'$, engaging the pin $m$, and with a cam-face $n'$ in proximity to the pin $n$. In operation the terminal piece normally stands as shown in Fig. 12, but upon its inclination its cam-face $n'$ abuts against the pin $n$, and as it is further inclined the action of this cam-face against the pin tends to throw the terminal piece rearwardly until its recess $m'$ is out of engagement with the pin $m$, whereupon it will disengage from the supporting-piece and be thereby cut out of the circuit.

Fig. 13 shows another modification. The supporting-piece (here lettered I) is in this instance constructed with recesses $o$ $o$, and the terminal pieces (here lettered J) are constructed as hooks at their inner ends and adapted to enter and be retained by said recesses $o$, from which they will disengage and fall in case of the impairment of their conducting-sections $a$. The latter are here shown as fastened to their respective hooks J by passing through holes in the ends thereof and being secured therein by set-screws $p$. A leaf-spring K is shown as mounted on the supporting-piece I and engaging studs $q$ on the respective hooks J, the tension of the spring tending to facilitate the escape of the hooks from their sockets.

Fig. 14 shows a somewhat similar modification in which the supporting-piece (here lettered I') is constructed with sockets $o'$, closed at their outer ends by screw-caps and containing each a compression-spring K', and the terminal pieces (here lettered J') are constructed with hooks at their inner ends entering said sockets and acted on by said springs, the latter tending to expel the hooks from the sockets.

In operation according to the construction shown in Figs. 13 and 14 the terminal pieces are retained in position by the tension of their conducting-sections $a$ $a$ against the disengaging tendency of the springs. Upon reduction of the tension of the conducting-section of either terminal piece the latter will be disengaged under the action of the spring.

Figs. 15 and 16 illustrate a modification of my invention adapted to a trolley-wire traversing a curve. The supporting-piece is here shown at the left-hand side as constructed like that shown and described with reference to Fig. 12; but at the right-hand side it is constructed with a recess $r$, within which slides the terminal piece (here lettered L) of the wire traversing the curve, (here lettered $a'$.) The terminal piece L is constructed with an eye $r'$ on its upper side, and a pivoted lever M, fulcrumed on a stud $s$ to the supporting-piece, has a hooked end $s'$, engaging the eye $r'$ of the terminal piece L to prevent its escape from the supporting-piece, (here lettered N.) The other end of the lever M projects upwardly and terminates in an eye which is engaged by a spring P, tending to tilt the lever to disengage its hooked end from the terminal piece and thereby permit it to fall. This tendency of the spring P is counteracted by a wire Q, fastened at its end to the upper end of the lever M and extending thence over the section $a'$, being movably carried over pulleys $t$, mounted on posts D D and connected to the section $a'$ at intervals throughout the curve. The weight and tension of the conducting-section $a$ is here carried by the wire Q, which is thereby depressed and distorted, and its load being transmitted to the upper end of the lever M maintains the latter in the position shown in Fig. 15, whereby its hooked end prevents the escape of the terminal piece L; but should the section A break its tension would thereby be destroyed, whereupon the wire Q would be drawn taut and its slack taken up by the tension of the spring P, which would thereby shift the lever M until it disengaged from the terminal piece L, whereupon the latter would disengage from the supporting-piece N and be cut out of circuit.

I claim as my invention the following-defined novel features or improvements, substantially as hereinbefore set forth, namely:

1. A support for electric conductors consisting of the supporting-piece G having cam projection $g$, in combination with the terminal piece F pivotally connected to said supporting-piece, adapted normally to be supported thereby, and having arm $j$ adapted to engage with said cam projection upon the tilting of the terminal piece, and thereby to disconnect the latter from said supporting-piece.

2. In a support for trolley-wires, the combination with the trolley-wire, a supporting-piece therefor, a terminal piece connected to said wire and supported by said supporting-piece, a supporting-wire over said trolley-wire adapted to sustain the weight thereof, and means for connecting said terminal piece to said supporting-piece connected to the ends of said supporting-wire and actuated under the tension thereof to maintain said terminal and supporting pieces in engagement, and constructed upon the impairment of said trolley-wire to react against said supporting-wire and disengage said supporting and terminal pieces, substantially as and for the purpose set forth.

3. In a supporting device for overhead electric conductors, a support or hanger of conducting material having a straight lower edge to coöperate with the trolley-wheel, and a supporting coupling member formed integral with said hanger, combined with a supported coupling member adapted to be connected with the conductor or trolley-wire and to be coupled to and uncoupled from the said supporting member as described, said supporting and supported members overlapping one another and being reduced in thickness in the overlapping portions, whereby the overlapping portions afford a path for the trolley-wheel of substantially uniform thickness with the remainder of the path of the trolley-wheel.

4. In a support for overhead conductors, a supporting member combined with a supported coupling member adapted to be connected with the conductor and to be coupled to and uncoupled from said supporting member as described, said members overlapping and one being reduced in thickness at its overlapping part, whereby a relatively narrow path for a trolley-wheel is afforded by the support where the members overlap, and said coupling member separably connected to said supporting member and entirely unsupported when uncoupled therefrom.

5. In a support for overhead conductors, a supporting member combined with a supported member separably coupled thereto and adapted to be connected with a conductor or trolley-wire, one of said members having a recess and the other having a projection entering said recess, said members overlapping near said recess and projection, and there furnishing a path for the trolley-wheel, and said coupling member separably connected to said supporting member and entirely unsupported when uncoupled therefrom.

6. In a support for overhead conductors, a supporting member and a supported member, the latter adapted to be connected to a conductor for a trolley-wheel and separably coupled to the supporting member, said members overlapping having reciprocal coupling provisions connecting them together, and having reciprocal bottom faces substantially coinciding and constituting a substantially uniform path across the support for a trolley-wheel, and said coupling member separably connected to said supporting member and entirely unsupported when uncoupled therefrom.

In witness whereof I have hereunto signed my name in the presence of two subscribing witnesses.

WILLIAM McELROY.

Witnesses:
GEORGE H. FRASER,
CHARLES K. FRASER.